United States Patent
Yu et al.

(10) Patent No.: US 11,775,507 B2
(45) Date of Patent: Oct. 3, 2023

(54) METHODS AND APPARATUSES FOR READING AND UPDATING DATA STRUCTURES, AND ELECTRONIC DEVICES

(71) Applicant: Advanced New Technologies Co., Ltd., Grand Cayman (KY)

(72) Inventors: Benquan Yu, Hangzhou (CN); Haizhen Zhuo, Hangzhou (CN); Zhonghao Lu, Hangzhou (CN); Faqiang Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/163,279

(22) Filed: Jan. 29, 2021

(65) Prior Publication Data

US 2021/0256012 A1   Aug. 19, 2021

Related U.S. Application Data (63) Continuation of application No. PCT/CN2019/114608, filed on Oct. 31, 2019.

(30) Foreign Application Priority Data

Dec. 20, 2018 (CN) .......................... 201811565642.0

(51) Int. Cl.
*G06F 16/23* (2019.01)
*G06F 16/27* (2019.01)

(52) U.S. Cl.
CPC ...... *G06F 16/2379* (2019.01); *G06F 16/2365* (2019.01); *G06F 16/27* (2019.01)

(58) Field of Classification Search
CPC ... G06F 16/2365; G06F 16/27; G06F 16/2379
(Continued)

(56) References Cited

U.S. PATENT DOCUMENTS 10,126,264 B2    11/2018 Furtaw
10,855,475 B1 *  12/2020 Leach .................. H04L 9/0637
(Continued)

FOREIGN PATENT DOCUMENTS

CN    107180350    9/2017
CN    107526624    12/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Yu Zhao
(74) *Attorney, Agent, or Firm* — Fish & Richardson P.C.

(57) ABSTRACT

A computer-implemented method, medium, and system are disclosed. In one computer-implemented method, an invocation request sent by an initiator is received by a blockchain node in a blockchain network. The invocation request is associated with invocation of a smart contract in the blockchain network. The smart contract includes contract code, data, and pre-update metadata. A pre-update data structure described by the pre-update metadata is parsed by the blockchain node and by execution of the contract code. The pre-update data structure is associated with the data comprised in the smart contract. Following parsing of the pre-update data structure, the pre-update data structure is represented by the blockchain node using a computer programming language. The pre-update data structure specified by the computer programming language is sent by the blockchain node to the initiator.

17 Claims, 5 Drawing Sheets

(58) Field of Classification Search
USPC .......................................................... 707/703
See application file for complete search history.

(56) References Cited

U.S. PATENT DOCUMENTS

| | | | | |
|---|---|---|---|---|
| 10,871,948 | B1* | 12/2020 | Dowling | G06Q 20/02 |
| 11,238,220 | B1* | 2/2022 | Fletcher | G06F 16/88 |
| 2010/0251207 | A1* | 9/2010 | Allam | G06Q 10/06 717/104 |
| 2014/0129527 | A1* | 5/2014 | Barrat | G06F 16/2365 707/690 |
| 2014/0372963 | A1* | 12/2014 | Chandaria | G06F 8/00 717/100 |
| 2016/0092251 | A1* | 3/2016 | Wagner | G06F 11/301 718/1 |
| 2016/0292429 | A1* | 10/2016 | Manville | G06F 3/0641 |
| 2016/0328442 | A1* | 11/2016 | Waas | G06F 16/252 |
| 2017/0177855 | A1 | 6/2017 | Costa et al. | |
| 2017/0221052 | A1 | 8/2017 | Sheng et al. | |
| 2018/0096000 | A1* | 4/2018 | Harrison | G06F 16/288 |
| 2018/0113752 | A1* | 4/2018 | Derbakova | H04L 9/3239 |
| 2018/0158050 | A1* | 6/2018 | Chenard | H04L 9/0637 |
| 2018/0253452 | A1* | 9/2018 | Callan | H04L 9/3239 |
| 2018/0293576 | A1 | 10/2018 | Song et al. | |
| 2018/0349621 | A1 | 12/2018 | Schvey | |
| 2019/0028277 | A1* | 1/2019 | Jayachandran | H04L 9/085 |
| 2019/0034404 | A1* | 1/2019 | Anderson | G06F 40/186 |
| 2019/0036887 | A1* | 1/2019 | Miller | H04L 9/3213 |
| 2019/0122317 | A1* | 4/2019 | Hunn | H04L 9/3239 |
| 2019/0172282 | A1* | 6/2019 | Patel | H04L 9/3239 |
| 2019/0180329 | A1* | 6/2019 | Chetlur | G06Q 50/01 |
| 2019/0188655 | A1* | 6/2019 | Pandit | G06Q 20/223 |
| 2019/0236562 | A1* | 8/2019 | Padmanabhan | H04L 63/00 |
| 2019/0238525 | A1* | 8/2019 | Padmanabhan | H04L 63/0428 |
| 2019/0318346 | A1* | 10/2019 | Ben-David | G06Q 20/3674 |
| 2019/0325044 | A1* | 10/2019 | Gray | G06Q 20/3829 |
| 2019/0334920 | A1* | 10/2019 | Kelly | H04L 9/3239 |
| 2019/0356471 | A1* | 11/2019 | Vaughn | H04L 9/3239 |
| 2020/0052880 | A1* | 2/2020 | Bathen | H04L 9/14 |
| 2020/0074470 | A1* | 3/2020 | Deshpande | H04L 9/3239 |
| 2020/0117825 | A1* | 4/2020 | Vaswani | H04L 9/0897 |
| 2020/0126321 | A1* | 4/2020 | Swearingen | G06Q 50/30 |
| 2020/0134585 | A1* | 4/2020 | Xu | G06Q 20/02 |
| 2020/0160330 | A1* | 5/2020 | Yan | H04L 9/0861 |
| 2020/0167237 | A1* | 5/2020 | Knuhtsen | H04L 9/3239 |
| 2020/0200824 | A1* | 6/2020 | Narayanaswami | H02J 13/00032 |
| 2020/0202468 | A1* | 6/2020 | Bester | G06Q 10/10 |
| 2020/0204557 | A1* | 6/2020 | Singh | H04L 9/3239 |
| 2020/0266985 | A1* | 8/2020 | Covaci | G06F 9/44521 |
| 2020/0348916 | A1* | 11/2020 | Covaci | H04L 9/3263 |
| 2020/0357084 | A1* | 11/2020 | Lerato Hunn | H04L 9/32 |
| 2020/0364075 | A1 | 11/2020 | Xiao | |
| 2021/0091994 | A1* | 3/2021 | Meirosu | H04L 41/5006 |

FOREIGN PATENT DOCUMENTS

| | | |
|---|---|---|
| CN | 107807991 | 3/2018 |
| CN | 107844294 | 3/2018 |
| CN | 107995270 | 5/2018 |
| CN | 108052321 | 5/2018 |
| CN | 108664650 | 10/2018 |
| CN | 108694589 | 10/2018 |
| CN | 108718341 | 10/2018 |
| CN | 108769173 | 11/2018 |
| CN | 110032568 | 7/2019 |
| CN | 110032599 | 7/2019 |
| KR | 20180035570 | 4/2018 |
| TW | 201732666 | 9/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/114608, dated Jan. 31, 2020, 10 pages (with partial English translation).

Liu et al., "Research Progress of Blockchain Technology and Its Application in Information Security," Journal of Software, Apr. 27, 2018, 24 pages (with English abstract).

EP Extended Search Report in European Application No. 19898287.8, dated Sep. 7, 2021, 12 pages.

PCT International Preliminary Report on Patentability in International Application No. PCT/CN2019/114608, dated Jun. 16, 2021, 11 pages (with English translation).

* cited by examiner

METHODS AND APPARATUSES FOR READING AND UPDATING DATA STRUCTURES, AND ELECTRONIC DEVICES

CROSS-REFERENCE TO RELATED APPLICATIONS

This application is a continuation of PCT Application No. PCT/CN2019/114608, filed on Oct. 31, 2019, which claims priority to Chinese Patent Application No. 201811565642.0, filed on Dec. 20, 2018, and each application is hereby incorporated by reference in its entirety.

TECHNICAL FIELD

One or more embodiments of the present specification relate to the field of blockchain technologies, and in particular, to methods and apparatuses for reading and updating data structures, and electronic devices.

BACKGROUND

Blockchain technologies (also known as distributed ledger technologies) are decentralized distributed database technologies, have features such as decentralization, transparency, immutability, and trustworthiness, and are applicable to application scenarios with high demands for data reliability.

SUMMARY

In view of this, one or more embodiments of the present specification provide methods and apparatuses for reading and updating data structures, and electronic devices.

To achieve the previously described objective, one or more embodiments of the present specification provide the following technical solutions.

According to a first aspect of the one or more embodiments of the present specification, a method for reading data structures is provided and includes the following: a blockchain node in a blockchain network obtains an invocation request for a smart contract; in response to the invocation request, the blockchain node runs contract code included in the smart contract, to parse a data structure described by metadata included in the smart contract, and use a computer programming language to specify the data structure; and the blockchain node returns the data structure specified by the computer programming language to an initiator of the invocation request.

According to a second aspect of the one or more embodiments of the present specification, a method for updating data structures is provided and includes the following: a blockchain node in a blockchain network obtains an invocation request for a smart contract; the blockchain node obtains an updated data structure that is based on a computer programming language; and in response to the invocation request, the blockchain node runs contract code included in the smart contract, where the contract code is used to parse the updated data structure and specify the updated data structure as updated metadata that is based on a definition description language, to update pre-update metadata included in the smart contract.

According to a third aspect of the one or more embodiments of the present specification, an apparatus for reading data structures is provided and includes the following: an acquisition unit, configured to enable a blockchain node in a blockchain network to obtain an invocation request for a smart contract; a responding unit, configured to respond to the invocation request, so that the blockchain node runs contract code included in the smart contract, to parse a data structure described by metadata included in the smart contract, and use a computer programming language to specify the data structure; and a return unit, configured to enable the blockchain node to return the data structure specified by the computer programming language to an initiator of the invocation request.

According to a fourth aspect of the one or more embodiments of the present specification, an apparatus for updating data structures is provided and includes the following: a request acquisition unit, configured to enable a blockchain node in a blockchain network to obtain an invocation request for a smart contract; a structure acquisition unit, configured to enable the blockchain node to obtain an updated data structure that is based on a computer programming language; and a request responding unit, configured to respond to the invocation request, so that the blockchain node runs contract code included in the smart contract, where the contract code is used to parse the updated data structure and specify the updated data structure as updated metadata that is based on a definition description language, to update pre-update metadata included in the smart contract.

According to a fifth aspect of the one or more embodiments of the present specification, an electronic device is provided and includes the following: a processor; and a memory configured to store a processor-executable instruction, where the processor is configured to perform the method for reading data structures according to any one of the previously described embodiments.

According to a sixth aspect of the one or more embodiments of the present specification, an electronic device is provided and includes the following: a processor; and a memory configured to store a processor-executable instruction, where the processor is configured to perform the method for updating data structures according to any one of the previously described embodiments.

DETAILED DESCRIPTION

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with the present specification. On the contrary, the implementations are only examples of apparatuses and methods that are described in the appended claims in detail and consistent with some aspects of the present specification.

It is worthwhile to note that, steps of corresponding methods in other embodiments are not necessarily performed in the order shown and described in the present specification. Methods in some other embodiments can include more or less steps than those described in the present specification. In addition, a single step described in the present specification may be divided into a plurality of steps for description in other embodiments, and a plurality of steps described in the present specification may also be combined into a single step for description in other embodiments.

Figure 1:
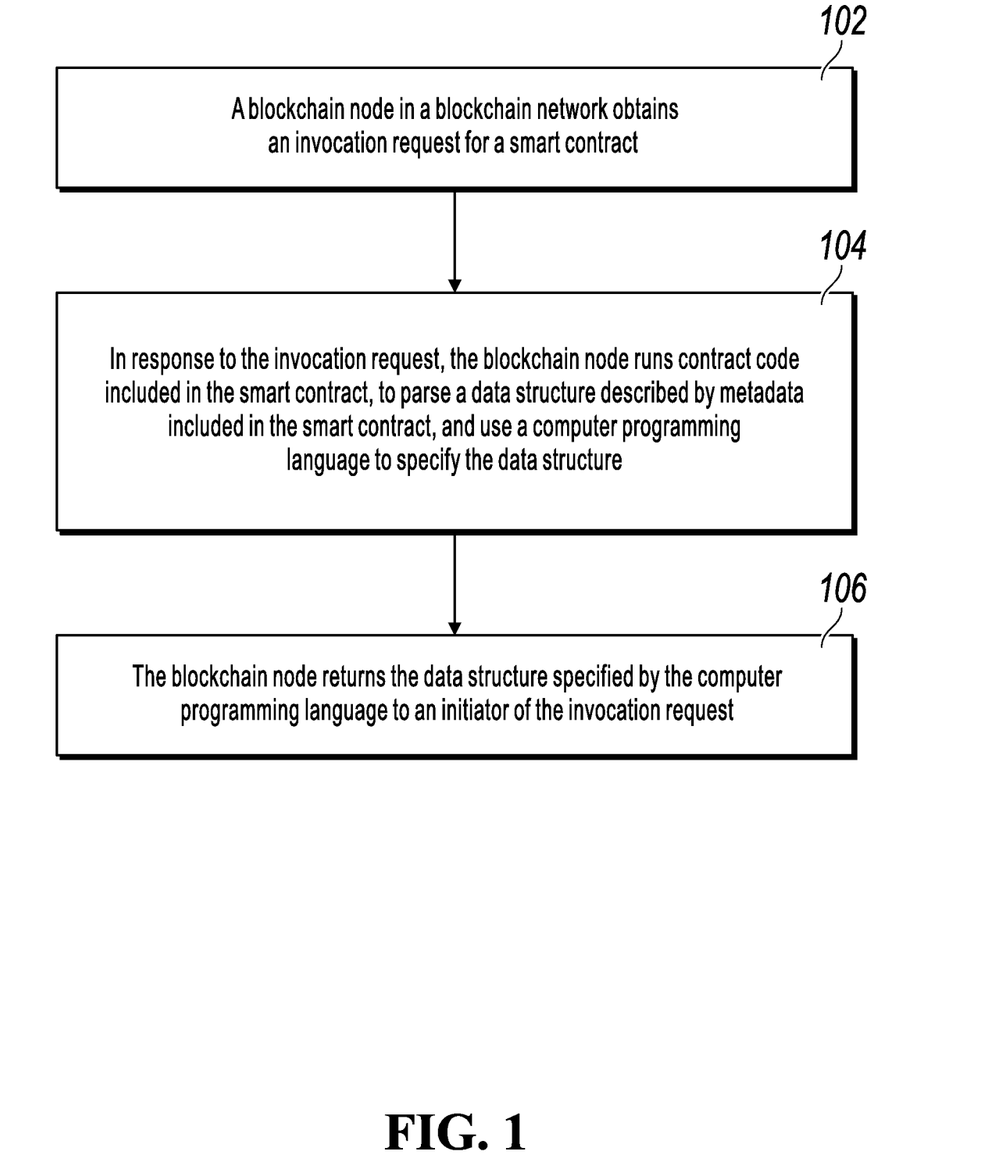
FIG. 1 is a flowchart illustrating a method for reading data structures, according to some example embodiments.

FIG. 1 is a flowchart illustrating a method for reading data structures, according to some example embodiments. As shown in FIG. 1, the method can include the following steps.

Step 102: A blockchain node in a blockchain network obtains an invocation request for a smart contract.

In some embodiments, the invocation request can be included in a transaction created in the blockchain network, and a contract address, port information, etc. of the smart contract to be invoked are specified in the transaction, so that the invocation request is confirmed to be "dedicated to" the smart contract, so as to execute contract code included in the smart contract.

In some embodiments, the transaction (transaction) in the present specification refers to data that is created by using a client device corresponding to the blockchain node and that needs to be finally published in a distributed database of the blockchain network. There are a transaction in a narrow sense and a transaction in a broad sense in the blockchain network. The transaction in a narrow sense refers to value transfer published in the blockchain network. For example, in a conventional bitcoin blockchain network, the transaction can be transfer initiated in the blockchain network. However, the transaction in a broad sense refers to service data that is published in the blockchain network and that has a service intention. For example, an operator can establish a consortium blockchain based on actual service needs, and deploy some other types of online services (such as a house rental service, a vehicle scheduling service, an insurance claim service, a credit service, and a medical service) unrelated to value transfer depending on the consortium blockchain. In such a consortium blockchain, the transaction can be a service message or a service request that is published in the consortium blockchain and that has a service intention.

In some embodiments, an initiator of the invocation request can include a certain role in the blockchain network. For example, the role can include a developer or a general user of the blockchain network. Based on the invoking of the smart contract, the role can quickly read a data structure of data included in the smart contract.

In some embodiments, the initiator of the invocation request can include other smart contracts different from the smart contract. For example, during execution, a contract operation based on the other smart contract needs to read a data structure of related data from a data set of the smart contract, so that the contract operation based on the other smart contract can initiate the previous invocation request to read the corresponding data structure. The other smart contract can be invoked by blockchain members or other smart contracts, and this is not limited in the present specification.

Step 104: In response to the invocation request, the blockchain node runs contract code included in the smart contract, to parse a data structure described by metadata included in the smart contract, and use a computer programming language to specify the data structure.

In some embodiments, roles such as developers can read and edit data structures that are based on computer programming languages. However, the metadata is specified by a definition description language and cannot be read or edited directly. Therefore, the contract code included in the smart contract can be used to implement a function module for conversion between the computer programming language and the definition description language, to parse the metadata specified by the definition description language and further convert the definition description language to the computer programming language for specification, so that the previous roles can conveniently read the data structure of the data included in the smart contract.

In some embodiments, the smart contract can include several structures, such as a code structure for recording code and a storage structure for recording data sets and metadata. In other embodiments, code, data sets, and metadata can be recorded in other structures in the smart contract, and this is not limited in the present specification.

In some embodiments, the data structure can include the following: included data fields, hierarchical relationships between the data fields, value relationships between the data fields, etc. This is not limited in the present specification.

Step 106: The blockchain node returns the data structure specified by the computer programming language to an initiator of the invocation request.

In some embodiments, the computer programming language can include a language of a predetermined type. For example, the computer programming language can be predetermined to use Solidity, JavaScript, Python, etc. This is not limited in the present specification.

In some embodiments, the computer programming language can include a language of a type indicated in the invocation request. In other words, the initiator of the invocation request can specify the type of computer programming language that the initiator expects to use. The initiator can specify any type of computer programming language, or select a type from a plurality of preconfigured types. This is not limited in the present specification.

Figure 2:
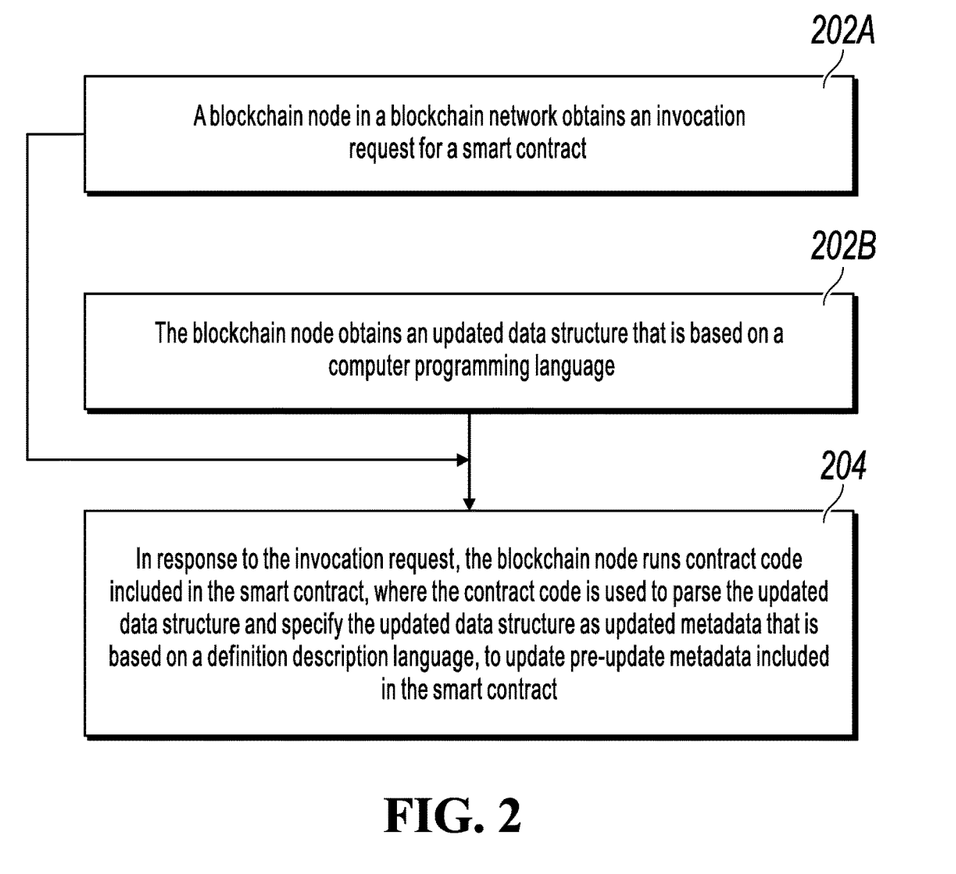
FIG. 2 is a flowchart illustrating a method for updating data structures, according to some example embodiments.

FIG. 2 is a flowchart illustrating a method for updating data structures, according to some example embodiments. As shown in FIG. 2, the method can include the following steps.

Step 202A: A blockchain node in a blockchain network obtains an invocation request for a smart contract.

In some embodiments, the invocation request can be included in a transaction created in the blockchain network, and a contract address, port information, etc. of the smart contract to be invoked are specified in the transaction, so that the invocation request is confirmed to be "dedicated to" the smart contract, so as to execute contract code included in the smart contract.

In some embodiments, the transaction (transaction) in the present specification refers to data that is created by using a client device corresponding to the blockchain node and that needs to be finally published in a distributed database of the blockchain network. There are a transaction in a narrow sense and a transaction in a broad sense in the blockchain network. The transaction in a narrow sense refers to value transfer published in the blockchain network. For example, in a conventional bitcoin blockchain network, the transaction can be transfer initiated in the blockchain network. However, the transaction in a broad sense refers to service data that is published in the blockchain network and that has a service intention. For example, an operator can establish a consortium blockchain based on actual service needs, and deploy some other types of online services (such as a house rental service, a vehicle scheduling service, an insurance claim service, a credit service, and a medical service) unrelated to value transfer depending on the consortium blockchain. In such a consortium blockchain, the transaction can be a service message or a service request that is published in the consortium blockchain and that has a service intention.

In some embodiments, an initiator of the invocation request can include a certain role in the blockchain network. For example, the role can include a developer or a general user of the blockchain network. Based on the invoking of the smart contract, the role can conveniently update a data structure of data included in the smart contract.

Step 202B: The blockchain node obtains an updated data structure that is based on a computer programming language.

In some embodiments, the developer can read the data structure of the data included in the smart contract by using an implementation such as the implementation shown in FIG. 1, and update the data structure based on the computer programming language to obtain the updated data structure.

In some embodiments, the computer programming language can include a language of a predetermined type. For example, the computer programming language can be predetermined to use Solidity, JavaScript, Python, etc. This is not limited in the present specification.

In some embodiments, the data structure can include the following: included data fields, hierarchical relationships between the data fields, value relationships between the data fields, etc. This is not limited in the present specification.

In some embodiments, step 202A and step 202B do not need to occur in a certain order, as long as step 202A and step 202B occur before step 204. This is not limited in the present specification.

Step 204: In response to the invocation request, the blockchain node runs contract code included in the smart contract, where the contract code is used to parse the updated data structure and specify the updated data structure as updated metadata that is based on a definition description language, to update pre-update metadata included in the smart contract.

In some embodiments, the smart contract can include several structures, such as a code structure for recording code and a storage structure for recording data sets and metadata. In other embodiments, code, data sets, and metadata can be recorded in other structures in the smart contract, and this is not limited in the present specification.

In some embodiments, roles such as developers can read and edit data structures that are based on computer programming languages. However, the metadata is specified by a definition description language and cannot be read or edited directly. Therefore, the contract code included in the smart contract can be used to implement a function module for conversion between the computer programming language and the definition description language, to parse the metadata specified by the definition description language and further convert the definition description language to the computer programming language for specification, so that the previous roles can update the data structure of the data by using the computer programming language, and conveniently update the updated data structure to the corresponding metadata by using the smart contract, so as to update the data structure of the data included in the smart contract by using the updated metadata. In this way, especially in the development phase or the maintenance phase, the roles such as the developers can quickly read and modify the data structure of the data included in the smart contract.

In some embodiments, the contract code is further used to compare a pre-update data structure corresponding to the pre-update metadata with the updated data structure, to verify the consistency of the updated data structure; and when the consistency of the updated data structure passes the verification, the updated metadata is used to update the pre-update metadata. For example, assume that the data in the smart contract includes fields such as Account ID, Age, and Telephone number, and during recording, "01" is used to represent "Account ID", "02" is used to represent "Age", "03" is used to represent "Telephone number", etc. In the updated data structure, if "02" is changed to represent "Telephone number", and "03" still represents "Telephone number", the "Telephone number" field is inconsistent, causing inconsistency of the updated data structure. The pre-update metadata should not be updated directly, and the invoker (such as the developer) of the smart contract should be alerted to make changes.

Figure 3:
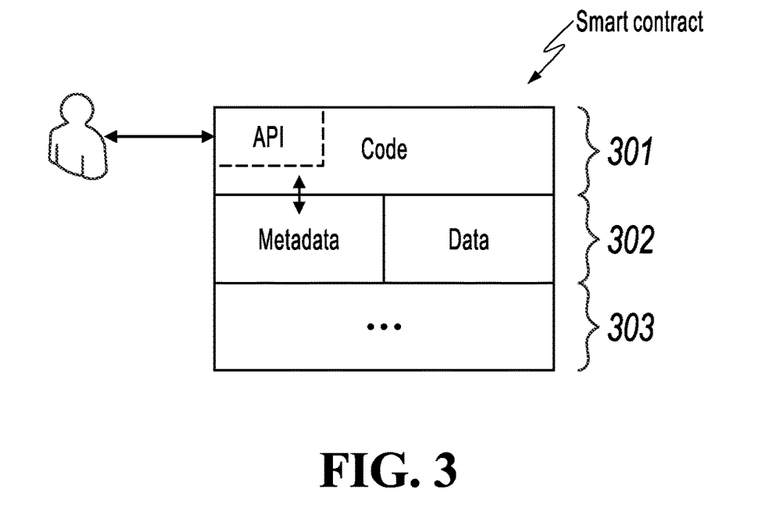
FIG. 3 is a diagram illustrating a structure of a smart contract, according to some example embodiments.

FIG. 3 is a diagram illustrating a structure of a smart contract, according to some example embodiments. As shown in FIG. 3, in the embodiments of the present specification, a structure improvement is implemented for smart contracts in blockchain networks, to implement the data reading and writing solutions based on the present specification. The smart contract can include a structure 301. For example, the structure 301 can be called a code structure, which is used to record contract code (referred to as code for simplicity) of the smart contract. The smart contract can include a structure 302. For example, the structure 302 can be called a storage structure, which is used to record contract data (referred to as data for simplicity) of the smart contract. Metadata corresponding to the contract data is used to describe the corresponding contract data. The smart contract can further include other structures 303, such as a balance structure and a nonce structure in related technologies. This is not limited in the present specification.

The smart contract can provide an Application Programming Interface (API) as an external interface for the code in the structure 301, to implement the invoking of the code. In the embodiments of the present specification, staff members can invoke the code included in the smart contract by using the API interface provided by the smart contract. After the code is executed, the metadata included in the smart contract can be parsed and provided to users such as developers in the form of computer programming language, or the metadata is updated based on an updated data structure provided by users such as developers, so as to read or update the data structure of the data included in the smart contract.

In the technical solutions of the present specification, assume that user A develops or maintains the smart contract (for example, user A is the developer). The metadata in the smart contract is described by using a definition description language, but the staff members are good at performing development or maintenance by using computer programming languages. The code included in the smart contract can not only be used to read or update the metadata, but also implement conversion between the definition description language and the computer programming language. That is, the code can be implemented as a module for conversion between the definition description language and the computer programming language, thereby helping the staff members in conveniently developing or maintaining the metadata included in the smart contract by invoking the code included in the smart contract, to further read or update the data structure of the data included in the smart contract.

Figure 4:
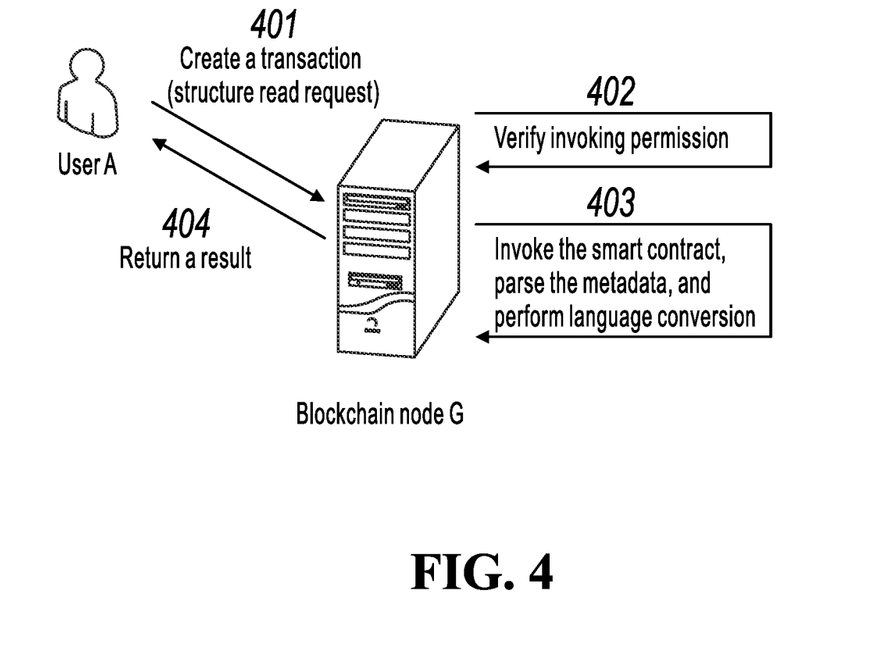
FIG. 4 is a diagram illustrating how to read data structures, according to some example embodiments.

FIG. 4 is a diagram illustrating how to read data structures, according to some example embodiments. As shown in FIG. 4, a process of reading data structures can include the following steps.

Step 401: Create a transaction.

In some embodiments, assume that user A needs to read the data structure of the data included in the previously described smart contract, so as to change the data structure. Therefore, user A can create a transaction for reading the data structure—equivalent to a structure read request, and publish the transaction in the blockchain network. Assume that blockchain node G responds to the transaction published by user A. Blockchain node G is usually a blockchain node closest to user A. Certainly, this is not limited in the present specification.

In some embodiments, based on the embodiment shown in FIG. 3, the metadata included in the storage structure of the smart contract records a data structure of related data, and the code included in the code structure of the smart contract can implement mutual conversion between the definition description language of the metadata and the computer programming language well known by user A. Therefore, user A can invoke the code included in the code structure of the smart contract by using the transaction, to parse the data structure of the data included in the smart contract, so that the data structure is presented to user A based on the computer programming language.

In some embodiments, there can be many smart contracts in the blockchain network, which are respectively used to achieve corresponding events or purposes. Therefore, the transaction can include a contract address, port information, etc. of the smart contract to be invoked, so that based on the contract address, blockchain node G can determine that the transaction needs to invoke the smart contract, and invoke the code included in the smart contract based on the port information.

In some embodiments, after the smart contract is created and published in the blockchain network, a consensus is reached among the blockchain nodes in the blockchain network, and the smart contract is recorded to the blockchain nodes. For example, the smart contract is also recorded to blockchain node G.

Step 402: Blockchain node G verifies invoking permission of user A for the smart contract.

In some embodiments, the smart contract can be configured with invoking permission, similar to the form of whitelist or blacklist, so as to avoid arbitrary invoking of the smart contract and avoid arbitrary reading or changing of the metadata or data included in the smart contract, thereby avoiding security risks. For example, when the blockchain network is a public blockchain, users with the invoking permission can be some users previously agreed upon. For another example, when the blockchain network is a consortium blockchain, users with the invoking permission can be consortium members. Therefore, when the smart contract is invoked by user A, whether user A has the invoking permission for the smart contract can be determined. If user A has the invoking permission, subsequent steps are performed. Otherwise, failure information can be returned.

It is worthwhile to note that, based on the feature of distributed data storage of the blockchain network, data published in the blockchain network needs to be recorded to all blockchain nodes, so that the data is immutable and is traceable. However, some data may have a certain degree of privacy. If the data is published in the blockchain network, the privacy cannot be guaranteed. If the data is not published in the blockchain network, the data content may be unreliable, and the blockchain nodes cannot quickly read or invoke the data structure of related data. Therefore, in the present specification, the data with privacy needs and the metadata of the data are recorded in the smart contract, and through management of the invoking permission, users without the permission are prevented from arbitrarily accessing related data and the metadata of the related data, so that the data and the metadata can not only be published in the blockchain network to leverage the reliability and convenience provided by the blockchain network, but also ensure that the data and the metadata have sufficient privacy and security.

Step 403: Blockchain node G invokes the smart contract, parses the metadata included in the smart contract, and performs language conversion on the metadata.

In some embodiments, by invoking the smart contract, blockchain node G can execute the code included in the smart contract, to implement related functions, for example, parsing and language conversion of the metadata included in the smart contract. The code can include a first code snippet, and the first code snippet is used to implement the parsing function on the metadata, to obtain the data structure described by the metadata (namely the data structure of the data included in the smart contract). The code can include a second code snippet, and the second code snippet is used to implement the language conversion function, to convert the definition description language of the metadata to the computer programming language.

In some embodiments, user A can add an input parameter for the smart contract in the previous transaction. For example, the input parameter can include an operation type. When the operation type is "read metadata", after the code included in the smart contract is executed, the metadata included in the smart contract can be read, and the metadata is parsed to obtain the data structure of the data included in the smart contract.

Further, the metadata included in the smart contract is specified by the definition description language. Therefore, after the code included in the smart contract is executed, the parsed data structure is specified by the computer programming language, to be provided to user A for viewing.

In some embodiments, user A can add an input parameter for the smart contract in the previous transaction. For example, the input parameter can include a type of computer programming language. That is, user A can specify a certain type of computer programming language, so that after the code included in the smart contract is executed, the parsed data structure can be specified by this type of computer programming language for user A to view or edit.

In some embodiments, the data structure in the present specification can include the following: data fields involved in the data, hierarchical relationships between the data fields, value relationships between the data fields, etc. All information that can be used to describe the data included in the smart contract can be provided to user A as the data structure here.

In some embodiments, the input parameter added by user A in the previous transaction can include types of data structures, such as several types of data structures that user A focuses on, so that after the code included in the smart contract is executed, these types of data structures can be selected and provided to user A. Other types of data structures are not provided to user A, which makes the data structures viewed by user A more relevant and more in line with the actual needs of user A. In addition, a process of parsing and specifying the other types of data structures is avoided, which helps to improve the efficiency of reading data structures.

Step 404: Blockchain node G returns a processing result to user A.

User A can update the data structure of the data included in the smart contract. For example, after reading the pre-update data structure of the data included in the smart contract based on the embodiment shown in FIG. 4, user A can modify the pre-update data structure to obtain an updated data structure, update the metadata included in the smart contract based on the updated data structure, and then update the data structure of corresponding data based on updated metadata. Certainly, user A can alternatively use other methods to obtain the pre-update data structure of the data included in the smart contract. This is not limited in the present specification.

Figure 5:
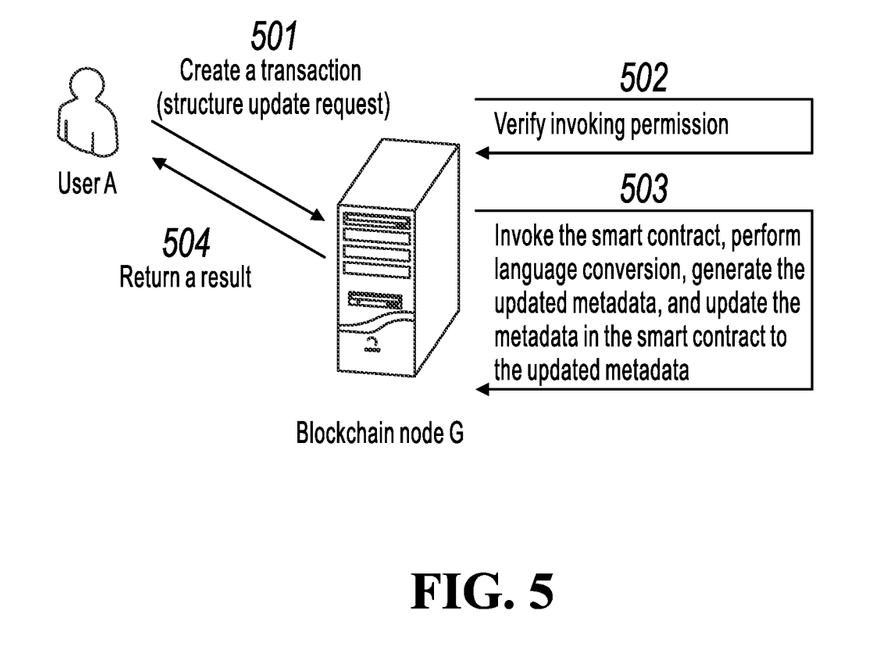
FIG. 5 is a diagram illustrating how to update data structures, according to some example embodiments.

Correspondingly, FIG. 5 is a diagram illustrating how to update data structures, according to some example embodiments. As shown in FIG. 5, a process of updating data structures can include the following steps.

Step 501: Create a transaction.

In some embodiments, assume that user A needs to update the data structure of the data included in the previous smart contract. User A can create a transaction for updating the data structure—equivalent to a structure update request, and publish the transaction in the blockchain network. Assume that blockchain node G responds to the transaction published by user A. Blockchain node G is usually a blockchain node closest to user A. Certainly, this is not limited in the present specification.

In some embodiments, based on the embodiment shown in FIG. 3, user A can modify the pre-update data structure of the data included in the smart contract to obtain an updated data structure, and the updated data structure is specified by the computer programming language well known by user A. After the code included in the smart contract is executed, mutual conversion between the definition description language of the metadata and the updated data structure specified by the computer programming language can be performed, to obtain updated metadata, and update the data structure of the data included in the smart contract based on the updated metadata.

In some embodiments, the transaction can include a contract address, port information, etc. of the smart contract, so that based on the contract address, blockchain node G can determine that the transaction needs to invoke the smart contract, and invoke the code included in the smart contract based on the port information.

Step 502: Blockchain node G verifies invoking permission of user A for the smart contract.

In some embodiments, for step 502, references can be made to step 402 shown in FIG. 4. Details are omitted here for simplicity.

Step 503: Blockchain node G invokes the smart contract, performs language conversion on the updated data structure, generates the updated metadata, and updates the metadata in the smart contract to the updated metadata.

In some embodiments, the input parameter added by user A in the previous transaction can include the updated data structure, so that when the code included in the smart contract is executed, the updated data structure specified by the computer programming language can be converted to the updated metadata specified by the definition description language.

In some embodiments, the data structure in the present specification can include the following: data fields involved in the data, hierarchical relationships between the data fields, value relationships between the data fields, etc. All information that can be used to describe the data included in the smart contract can be provided to user A as the data structure here.

In some embodiments, updating data structures by user A can relate to data structures in any previously described aspects. For example, a data field is added, deleted, or modified, a hierarchical relationship between data fields is added, deleted, or modified, or a value relationship between data fields is added, deleted, or modified.

The following uses the addition, deletion, or modification of data fields as an example to describe in detail the data structures before and after the update.

Assume that the pre-update data structure of the data included in the smart contract can be specified according to Table 1 below, including personal information (such as an account ID, age, and an address) of the user that each account belongs to, and the holding status of each account for each type of blockchain asset.

TABLE 1

| Account ID | Age | Tel | ... | Balance-Type A | Balance-Type B | Total-RMB |
|---|---|---|---|---|---|---|
| 0001 | 26 | 139... | ... | 2000 | 1500 | 5000 |
| 0002 | 25 | 186... | ... | 1000 | 6000 | 13000 |
| 0003 | 32 | 166... | ... | 20000 | 2100 | 24200 |
| ... | ... | ... | ... | ... | ... | ... |

In one case, assume that user A updates the data structure by adding a data field. For example, a new data field "Balance-Type X" is added based on Table 1 above. Correspondingly, the updated data structure is shown in Table 2 below.

TABLE 2

| Account ID | Age | Tel | ... | Balance-Type A | Balance-Type B | Balance-Type X | Total-RMB |
|---|---|---|---|---|---|---|---|
| 0001 | 26 | 139... | ... | 2000 | 1500 | 0 | 5000 |
| 0002 | 25 | 186... | ... | 1000 | 6000 | 0 | 13000 |
| 0003 | 32 | 166... | ... | 20000 | 2100 | 0 | 24200 |
| ... | ... | ... | ... | ... | ... | ... | ... |

In another case, assume that user A updates the data structure by deleting a data field. For example, the original data field "Balance-Type X" is deleted based on Table 2 above. Correspondingly, the updated data structure is shown in Table 1 above.

In still another case, assume that user A updates the data structure by modifying a data field. For example, based on Table 1 above, the original data field "Total-RMB" is changed to "Total-Dollar". That is, RMB originally used to count the total amount of blockchain assets held by each account is changed to dollars. Correspondingly, the updated data structure is shown in Table 3 below.

TABLE 3

| Account ID | Age | Tel | ... | Balance-Type A | Balance-Type B | Total-Dollar |
|---|---|---|---|---|---|---|
| 0001 | 26 | 139... | ... | 2000 | 1500 | 768.9114 |
| 0002 | 25 | 186... | ... | 1000 | 6000 | 1999.1696 |
| 0003 | 32 | 166... | ... | 20000 | 2100 | 3721.5311 |
| ... | ... | ... | ... | ... | ... | ... |

In some embodiments, when the code included in the smart contract is executed, the updated data structure can further be verified, to determine whether the update performed by user A is consistent. For example, assume that the management of data fields in the smart contract is implemented through "identification". For example, the identifier "01" is used to represent the previous field "Account ID", the identifier "02" is used to represent the previous field "Age", and the identifier "03" is used to represent the previous field "Tel". In the updated data structure, if the field "Balance-Type X" shown in Table 2 is added based on Table 1, and the identifier "02" is used to represent the field "Balance-Type X". In this case, the identifier "02" corresponds to two different fields at the same time, which indicates that the update performed by user A is inconsistent. Prompt information can be returned to user A, and the update operation of the data structure can be suspended or terminated.

Certainly, in addition to the management method based on "identification", the smart contract can use other methods. This is not limited in the present specification. For example, the smart contract can also use the "offsetting" method. For example, the offset corresponding to the field "Account ID" as the starting field is 0. The field "Age" is the first field on the right side of the field "Account ID", and the offset of the field "Age" relative to the field "Account ID" is 1. Similarly, the offset of the field "Tel" relative to the field "Account ID" is 2, etc. In this way, the data fields and location relationships between the data fields are managed, and based on this, the consistency of the updated data structure is determined. Details are omitted here for simplicity.

In some embodiments, after the code included in the smart contract is executed, the pre-update metadata originally included in the smart contract can be replaced by the updated metadata, to update the metadata included in the smart contract.

Step 504: Blockchain node G returns a processing result to user A.

In some embodiments, because the updated metadata included in the smart contract uses the data structure updated by user A, when the code included in the smart contract is executed, the updated metadata can be parsed, and the data included in the smart contract is updated based on a parsing result, thereby finally implementing the update operation on the data structure of the data included in the smart contract.

In some embodiments, the code in the smart contract can include a third code snippet, and the third code snippet is used to implement the language conversion function, to convert the computer programming language to the definition description language, so as to convert the updated data structure provided by user A to the updated metadata. The code can include a fourth code snippet, and the fourth code snippet is used to implement the metadata update function, to update the pre-update metadata included in the smart contract to the updated metadata. The code can include a fifth code snippet, and the fifth code snippet is used to implement the data structure update function, to parse the updated metadata and update the data included in the smart contract based on a parsing result.

In some embodiments, after the metadata included in the smart contract is updated, the updated metadata can be parsed by executing the code included in the smart contract, and all data included in the smart contract can be updated based on a parsing result. For example, when the data structure is updated by changing the field "Total-RMB" shown in Table 1 to the field "Total-Dollar", the updated data can be shown in Table 3.

In some embodiments, after the metadata included in the smart contract is updated, data structure updating cannot be performed on all data included in the smart contract. Only when related data is involved, the data structure of these data is updated. For example, after the metadata included in the smart contract is updated, the data included in the smart contract can still temporarily use the data structure shown in Table 1.

TABLE 4

| Account ID | Age | Tel | ... | Balance-Type A | Balance-Type B | Total-RMB | Total-Dollar |
|---|---|---|---|---|---|---|---|
| 0001 | 26 | 139... | ... | 2000 | 1500 | 5000 | / |
| 0002 | 25 | 186... | ... | 1000 | 6000 | / | 1999.1696 |
| 0003 | 32 | 166... | ... | 20000 | 2100 | 24200 | / |
| ... | ... | ... | ... | ... | ... | ... | / |

Assume that the smart contract is invoked to query the total amount of blockchain assets corresponding to account ID 0002. In this case, the code included in the smart contract is executed to parse the updated metadata included in the smart contract. Because the updated data structure uses the field "Total-Dollar", as shown in Table 4 above, the field "Total-Dollar" can be added to the user information of "Account ID=0002", and the original data "13000" corresponding to the field "Total-RMB" is deleted, and is changed to "1999.1696" under the field "Total-Dollar", indicating that the total amount of blockchain assets held by the user corresponding to the account ID 0002 is equivalent to 1999.1696 dollars. Because only the data of "Account ID=0002" is involved, for this account, the field "Total-RMB" is changed to the field "Total-Dollar", but other accounts still use the field "Total-RMB" until related data is involved. In this way, especially when the number of accounts involved is small, the workload can be greatly reduced.

Figure 6:
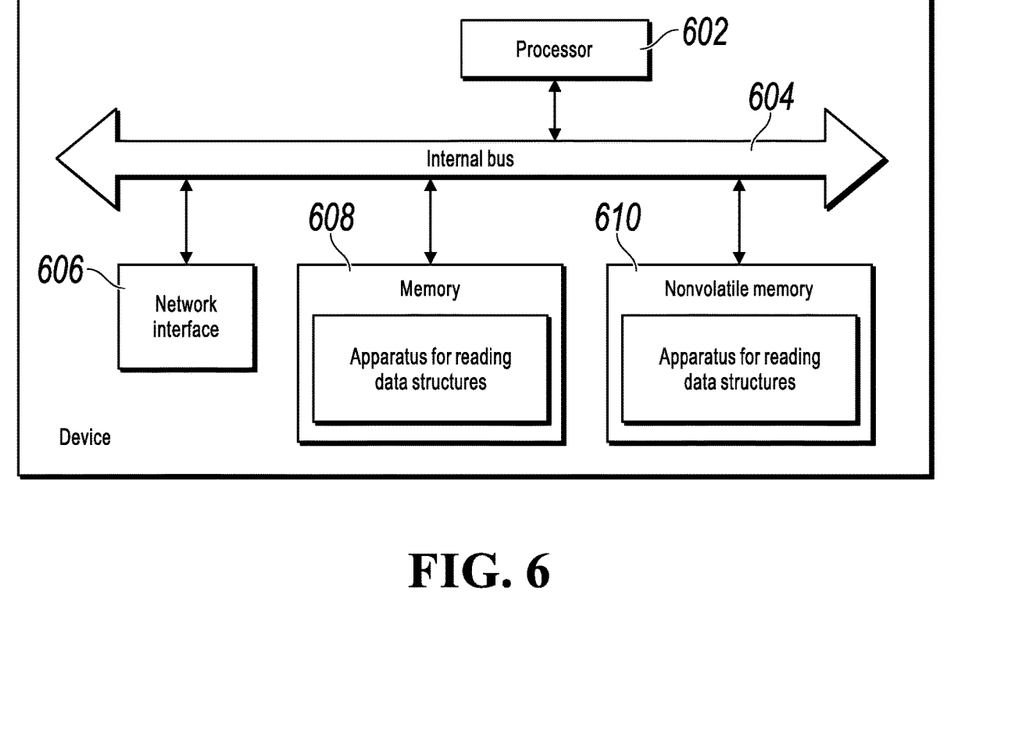
FIG. 6 is a diagram illustrating a structure of a device, according to some example embodiments.

FIG. 6 is a diagram illustrating a structure of a device, according to some example embodiments. Referring to FIG. 6, at the hardware level, the device includes a processor 602, an internal bus 604, a network interface 606, a memory 608, and a nonvolatile memory 610. Certainly, the device may further include hardware needed by other services. The processor 602 reads a corresponding computer program from the nonvolatile memory 610 into the memory 608 for running, to form an apparatus for reading data structures at the logical level. Certainly, in addition to software implementations, one or more embodiments of the present specification do not exclude other implementations, such as logic devices or a combination of hardware and software. That is, an execution body of the following processing procedure is not limited to logical units, but can also be hardware or logic devices.

Figure 7:
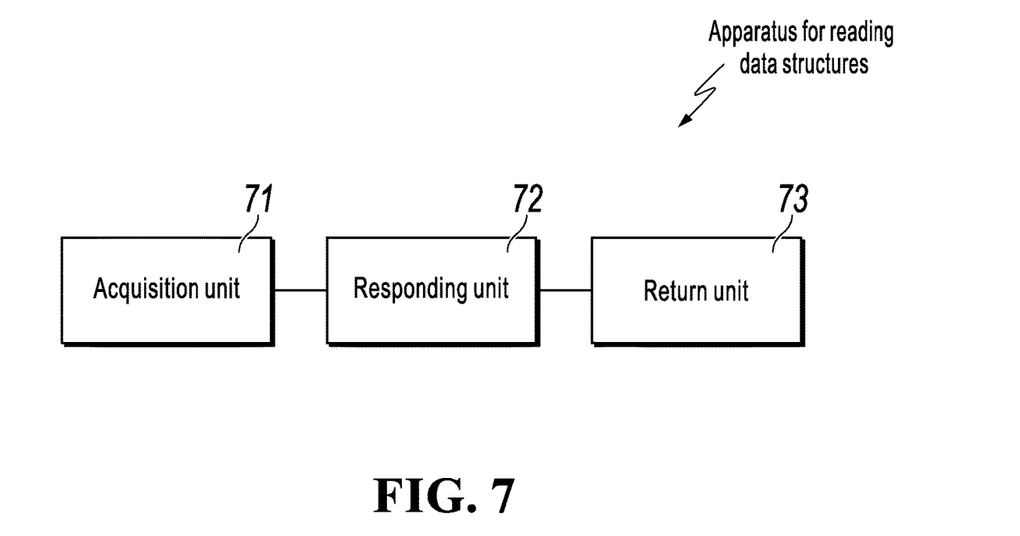
FIG. 7 is a block diagram illustrating an apparatus for reading data structures, according to some example embodiments.

Referring to FIG. 7, in software implementations, the apparatus for reading data structures can include the following: an acquisition unit 71, configured to enable a blockchain node in a blockchain network to obtain an invocation request for a smart contract; a responding unit 72, configured to respond to the invocation request, so that the blockchain node runs contract code included in the smart contract, to parse a data structure described by metadata included in the smart contract, and use a computer programming language to specify the data structure; and a return unit 73, configured to enable the blockchain node to return the data structure specified by the computer programming language to an initiator of the invocation request.

Optionally, the metadata is used to describe data included in the smart contract.

Optionally, the computer programming language includes a language of a predetermined type or a language of a type indicated in the invocation request.

Figure 8:
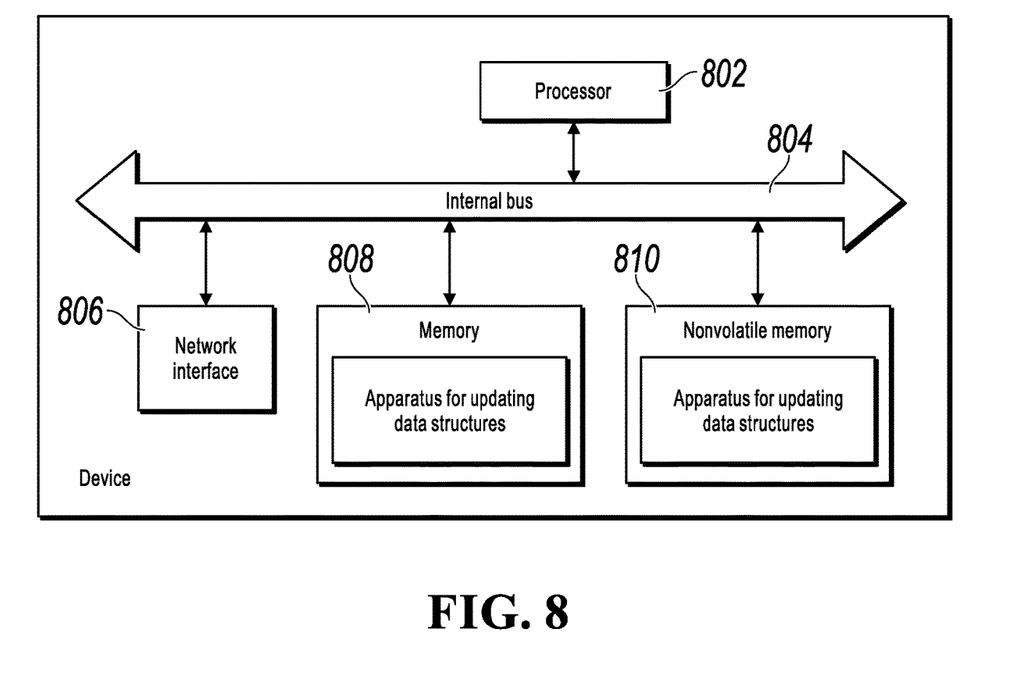
FIG. 8 is a diagram illustrating a structure of another device, according to some example embodiments.

FIG. 8 is a diagram illustrating a structure of a device, according to some example embodiments. Referring to FIG. 8, at the hardware level, the device includes a processor 802, an internal bus 804, a network interface 806, a memory 808, and a nonvolatile memory 810. Certainly, the device may further include hardware needed by other services. The processor 802 reads a corresponding computer program from the nonvolatile memory 810 into the memory 808 for running, to form an apparatus for updating data structures at the logical level. Certainly, in addition to software implementations, one or more embodiments of the present specification do not exclude other implementations, such as logic devices or a combination of hardware and software. That is, an execution body of the following processing procedure is not limited to logical units, but can also be hardware or logic devices.

Figure 9:
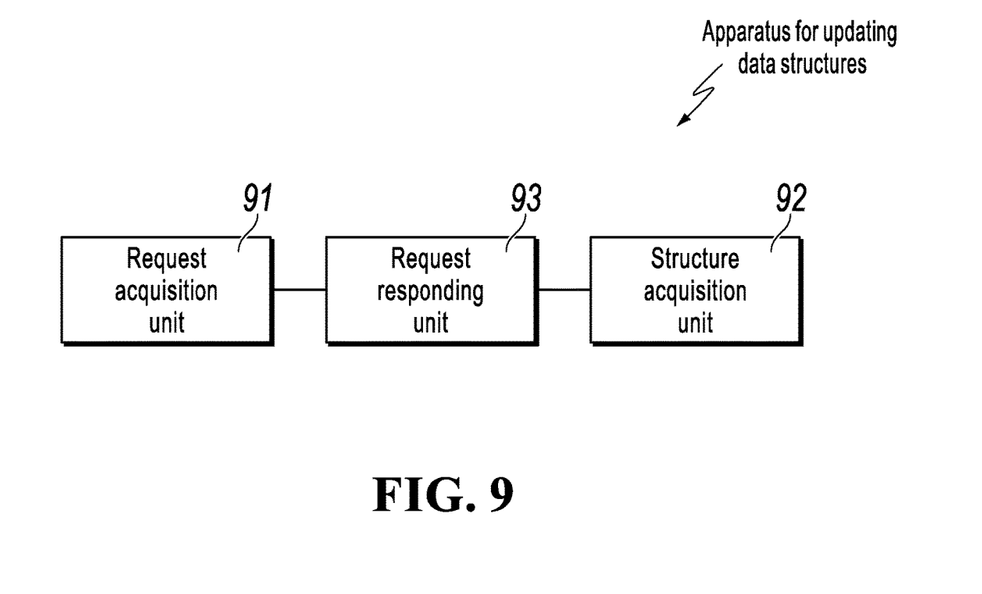
FIG. 9 is a block diagram illustrating an apparatus for updating data structures, according to some example embodiments.

Referring to FIG. 9, in software implementations, the apparatus for updating data structures can include the following: a request acquisition unit 91, configured to enable a blockchain node in a blockchain network to obtain an invocation request for a smart contract; a structure acquisition unit 92, configured to enable the blockchain node to obtain an updated data structure that is based on a computer programming language; and a request responding unit 93, configured to respond to the invocation request, so that the blockchain node runs contract code included in the smart contract, where the contract code is used to parse the updated data structure and specify the updated data structure as updated metadata that is based on a definition description language, to update pre-update metadata included in the smart contract.

Optionally, the metadata included in the smart contract is used to describe data included in the smart contract.

Optionally, the contract code is further used to compare a pre-update data structure corresponding to the pre-update metadata with the updated data structure, to verify the consistency of the updated data structure; and when the consistency of the updated data structure passes the verification, the updated metadata is used to update the pre-update metadata.

The system, apparatus, module, or unit described in the previously described embodiments can be implemented by a computer chip or an entity, or implemented by a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In typical configuration, the computer includes one or more processors (CPU), an input/output interface, a network interface, and a memory.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes permanent and non-permanent, removable and non-removable media, and can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a magnetic disk storage, a quantum memory, a graphene-based storage medium, or another magnetic storage device or any other non-transmission medium. The computer storage medium can be configured to store information that can be accessed by the computing device. Based on the definition in the present specification, the computer readable medium does not include a transitory computer readable medium (transitory media), for example, a modulated data signal and carrier.

It is worthwhile to further note that, the terms "include", "contain", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . ." does not preclude the existence of additional identical elements in the process, method, product, or device that includes the element.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more embodiments of the present specification are merely used to describe specific embodiments, and are not intended to limit the one or more embodiments of the present specification. The terms "a" and "the" of singular forms used in one or more embodiments of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more embodiments of the present specification to describe various types of information, the information is not limited to these terms. These terms are only used to differentiate between information of the same type. For example, without departing from the scope of one or more embodiments of the present specification, first information can also be referred to as second information, and similarly, the second information can be referred to as the first information. Depending on the context, for example, the word "if" used here can be explained as "while", "when", or "in response to determining".

The previous descriptions are merely example embodiments of the present specification, but are not intended to limit the present specification. Any modification, equivalent replacement, or improvement made without departing from the spirit and principle of the present specification shall fall within the protection scope of the present specification.

What is claimed is:

1. A computer-implemented method, comprising:
  receiving, by a blockchain node in a blockchain network, and from an initiator having access to the blockchain network, an invocation request associated with invocation of a smart contract associated with the blockchain network, wherein the smart contract comprises contract code, contract data, and first metadata, and the first metadata is not part of the contract data;
  in response to receiving the invocation request, parsing, by executing the contract code by the blockchain node, the first metadata to obtain a first data structure defined by the first metadata, wherein the first metadata defines, using a definition description language, the first data structure, wherein the definition description language is not directly editable by the initiator, and wherein the first data structure comprises a structure of the contract data comprised in the smart contract;
  following parsing of the first metadata, converting, by executing the contract code by the blockchain node, the definition description language to a computer programming language that is directly editable by the initiator;
  representing, by the blockchain node, the first data structure using the computer programming language;
  sending, by the blockchain node and to the initiator, the first data structure specified by the computer programming language;
  receiving, by the blockchain node and from the initiator, a second invocation request for the smart contract;
  receiving, by the blockchain node and from the initiator, a second data structure that is based on the computer programming language, wherein the second data structure is associated with the contract data comprised in the smart contract;
  in response to receiving the second invocation request, parsing, by the blockchain node, the second data structure by executing the contract code;
  following parsing of the second data structure, representing, by the blockchain node, second metadata using the second data structure, wherein the second metadata is based on the definition description language;
  updating, by the blockchain node and as updated first metadata, the first metadata using the second metadata; and
  updating, by the blockchain node, the contract data based on a result from parsing the updated first metadata.

2. The computer-implemented method of claim 1, wherein the first metadata is associated with description of the contract data comprised in the smart contract.

3. The computer-implemented method of claim 1, wherein the computer programming language comprises a language of a predetermined type or a language of a type indicated in the invocation request.

4. The computer-implemented method of claim 1, wherein the second metadata is associated with description of the contract data comprised in the smart contract.

5. The computer-implemented method of claim 1, wherein the updating, by the blockchain node, the first metadata using the second metadata comprises:
  comparing the first data structure with the second data structure; and
  verifying that the second data structure is consistent with the first data structure.

6. The computer-implemented method of claim 5, further comprising:
  in response to verifying that the second data structure is consistent with the first data structure, updating the first metadata using the second metadata.

7. A non-transitory, computer-readable medium storing one or more instructions executable by a computer system to perform operations comprising:
  receiving, by a blockchain node in a blockchain network, and from an initiator having access to the blockchain network, an invocation request associated with invocation of a smart contract associated with the blockchain network, wherein the smart contract comprises contract code, contract data, and first metadata, and the first metadata is not part of the contract data;
  in response to receiving the invocation request, parsing, by executing the contract code by the blockchain node, the first metadata to obtain a first data structure defined by the first metadata, wherein the first metadata defines, using a definition description language, the first data structure, wherein the definition description language is not directly editable by the initiator, and wherein the first data structure comprises a structure of the contract data comprised in the smart contract;
  following parsing of the first metadata, converting, by executing the contract code by the blockchain node, the definition description language to a computer programming language that is directly editable by the initiator;
  representing, by the blockchain node, the first data structure using the computer programming language;
  sending, by the blockchain node and to the initiator, the first data structure specified by the computer programming language;
  receiving, by the blockchain node and from the initiator, a second invocation request for the smart contract;
  receiving, by the blockchain node and from the initiator, a second data structure that is based on the computer programming language, wherein the second data structure is associated with the contract data comprised in the smart contract;
  in response to receiving the second invocation request, parsing, by the blockchain node, the second data structure by executing the contract code;
  following parsing of the second data structure, representing, by the blockchain node, second metadata using the second data structure, wherein the second metadata is based on the definition description language;
  updating, by the blockchain node and as updated first metadata, the first metadata using the second metadata; and
  updating, by the blockchain node, the contract data based on a result from parsing the updated first metadata.

8. The non-transitory, computer-readable medium of claim 7, wherein the first metadata is associated with description of the contract data comprised in the smart contract.

9. The non-transitory, computer-readable medium of claim 7, wherein the computer programming language comprises a language of a predetermined type or a language of a type indicated in the invocation request.

10. The non-transitory, computer-readable medium of claim 7, wherein the second metadata is associated with description of the contract data comprised in the smart contract.

11. The non-transitory, computer-readable medium of claim 7, wherein the updating, by the blockchain node, the first metadata using the second metadata comprises:
comparing the first data structure with the second data structure; and
verifying that the second data structure is consistent with the first data structure.

12. The non-transitory, computer-readable medium of claim 11, wherein the operations further comprise:
in response to verifying that the second data structure is consistent with the first data structure, updating the first metadata using the second metadata.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a blockchain node in a blockchain network, and from an initiator having access to the blockchain network, an invocation request associated with invocation of a smart contract associated with the blockchain network, wherein the smart contract comprises contract code, contract data, and first metadata, and the first metadata is not part of the contract data;
in response to receiving the invocation request, parsing, by executing the contract code by the blockchain node, the first metadata to obtain a first data structure described defined by the first metadata, wherein the first metadata defines, using a definition description language, the first data structure, wherein the definition description language is not directly editable by the initiator, and wherein the first data structure comprises a structure of the contract data comprised in the smart contract;
following parsing of the first metadata, converting, by executing the contract code by the blockchain node, the definition description language to a computer programming language that is directly editable by the initiator;
representing, by the blockchain node, the first data structure using the computer programming language;
sending, by the blockchain node and to the initiator, the first data structure specified by the computer programming language;
receiving, by the blockchain node and from the initiator, a second invocation request for the smart contract;
receiving, by the blockchain node and from the initiator, a second data structure that is based on the computer programming language, wherein the second data structure is associated with the contract data comprised in the smart contract;
in response to receiving the second invocation request, parsing, by the blockchain node, the second data structure by executing the contract code;
following parsing of the second data structure, representing, by the blockchain node, second metadata using the second data structure, wherein the second metadata is based on the definition description language;
updating, by the blockchain node and as updated first metadata, the first metadata using the second metadata; and
updating, by the blockchain node, the contract data based on a result from parsing the updated first metadata.

14. The computer-implemented system of claim 13, wherein the first metadata is associated with description of the contract data comprised in the smart contract.

15. The computer-implemented system of claim 13, wherein the computer programming language comprises a language of a predetermined type or a language of a type indicated in the invocation request.

16. The computer-implemented system of claim 13, wherein the second metadata is associated with description of the contract data comprised in the smart contract.

17. The computer-implemented system of claim 13, wherein the updating, by the blockchain node, the first metadata using the second metadata comprises:
comparing the first data structure with the second data structure; and
verifying that the second data structure is consistent with the first data structure; and
in response to verifying that the second data structure is consistent with the first data structure, updating the first metadata using the second metadata.

* * * * *

UNITED STATES PATENT AND TRADEMARK OFFICE
CERTIFICATE OF CORRECTION

PATENT NO. : 11,775,507 B2
APPLICATION NO. : 17/163279
DATED : October 3, 2023
INVENTOR(S) : Benquan Yu et al.

It is certified that error appears in the above-identified patent and that said Letters Patent is hereby corrected as shown below:

In the Claims

In Column 17, Lines 36-37, Claim 13, please replace "structure described defined" with -- structure defined --.

Signed and Sealed this
Nineteenth Day of December, 2023

Katherine Kelly Vidal
Director of the United States Patent and Trademark Office